Nov. 3, 1936.   J. A. STORM   2,059,287

DENTAL FLOSS HOLDER

Original Filed Jan. 21, 1935

INVENTOR
JAMES A. STORM
By Adam E. Fisher
ATTORNEY

Patented Nov. 3, 1936

2,059,287

UNITED STATES PATENT OFFICE 2,059,287

DENTAL FLOSS HOLDER

James A. Storm, St. Louis, Mo.

Application January 21, 1935, Serial No. 2,685
Renewed August 7, 1936

1 Claim. (Cl. 132—91)

This invention relates to dental floss holders, designed for supporting a strand of dental floss or thread between two prongs of a fork in a relatively taut relation for passing between the teeth of the user, for the purpose of removing therefrom particles of matter.

The prime object of the invention is to provide in a very simple and practicable form a device of this kind constructed integrally of thin sheet metal or other suitably stiff material and comprising a V-shaped floss holding fork symmetrically connected at its bight or angle to the extremity of an elongated handle, so that the prongs of the fork will lie equally spaced at either side of the extended longitudinal axis of the handle, both the prongs of the fork and the handle being notched for engaging a strand of floss and for supporting same in the form of an isosceles triangle with the altitudinal line thereof coinciding with the longitudinal axis of the handle, the divergent branches of the strand of floss lying along and being protected by the prongs of the fork, and by which arrangement any degree of pull or tension upon the joined ends of the strand at the handle, will result in the greatest or maximum tension of the cross strand of floss between the prongs of the fork, a desirable condition in the use of the device.

With the foregoing and such other objects and advantages in view as may appear, attention is directed to the following specification and the accompanying drawing, wherein.

Figures 1, 2, 3, 4:
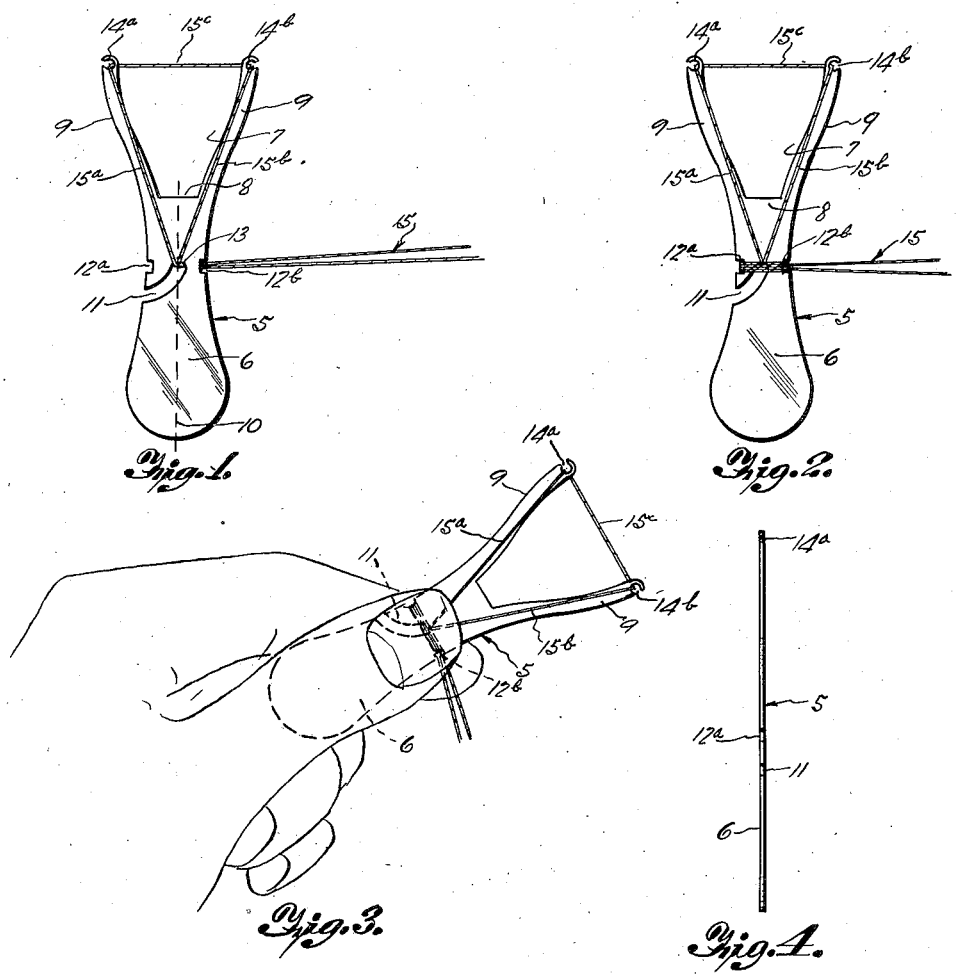
Figure 1 is a side elevation of the device with a strand of floss arranged thereon in working position, the joined ends of the strand being brought out laterally of the device, for illustrating the first step in mounting the floss upon the holder.
Figure 2 is a view similar to that of Figure 1, the ends of the strand however being shown wound transversely around the handle, as means for locking the strand tautly in its working position.
Figure 3 is a view similar to that of Figure 2, showing the manner of holding the device in the hand of the operator, ready for use.
Figure 4 is an edge view of the device.

In carrying out this invention, I provide an integral form of floss holder referred to generally at 5, the same being formed of thin sheet metal or other suitably stiff material and including an elongated handle 6 and a V-shaped floss holding fork 7 symmetrically connected at its bight or angle 8 to the extremity of the handle, in such manner that the prongs 9 of the fork will lie equally spaced at either side of the extended longitudinal axis of the handle, the said axis being indicated in dotted lines at 10. The handle 6 is formed with a centering notch 11 extended obliquely thru one margin and ending at the said axial line 10, and with the lock notches 12a—12b in the lateral margins of the handle and which are transversely aligned with each other and with the inner closed end 13 of the centering notch.

The extremities of the prongs 9 are formed with notches 14a—14b opening oppositely and laterally outward, the same constituting floss engaging notches. The inner end 13 of the centering notch 11 of the handle is so positioned relative to the notches 14a—14b, that when a strand of dental floss as indicated generally at 15 is drawn taut thru and between the notches 14a—14b and the free ends of the strand then joined and drawn down together thru the centering notch 11 to the closed end 13 thereof, the strand of floss as a whole will assume the form of an isosceles triangle, with the altitudinal line thereof coinciding with the axial line 10 of the handle, this arrangement and formation of the floss being clearly shown in the three first figures of the drawing. Likewise the divergent branches 15a—15b of the strand of floss will lie exactly along the prongs 9 of the fork and thus be protected by the margins of those prongs in the use and operation of the tool.

In use, the operator supports the tool between the thumb and forefinger of one hand, and takes a short length of floss 15 and loops it thru the notches 14a—14b. He then draws the joined ends of the strand tautly to one side of the tool or holder and down thru the centering notch 11 to the closed end 13 thereof, as represented in Figure 1. He then passes the joined ends of the strand back and over and transversely around the handle within the lock notches 12a—12b, once or twice, and finally places his thumb or forefinger upon the strands at the point they cross the handle, thus securing the strand operatively in position upon the holder. The holder with the strand of floss so mounted is held in the described position during use, and may be readily manipulated for the purpose of cleaning the teeth after the manner of floss holders in general. In this process the branches 15a—15b of the floss strand are entirely out of the way and protected by the prongs of the fork in manner already pointed out, and at the same time the working branch 15c of the floss strand is supported tautly in the desired operative position.

It will be noted that the arrangement is such that the branches 15a—15b are preferably longer than the working branch 15c of the floss, thus rendering it easier to maintain the tension of the working branch 15c thru strain upon the lateral branches, in the manner pointed out.

While I have herein set out and described certain preferred structural features of the invention, it is understood that I am not to be strictly limited thereto, but that I may vary same in minor details so as to best reduce the invention to actual practice, not departing however from the spirit of the invention as defined in the appended claim.

I claim:

In a dental floss holder formed of relatively rigid material and including a handle and a V-shaped form symmetrically extended from its bight portion at one end of the handle, the prongs of the fork being notched oppositely and outwardly at their extremities for engaging a strand of floss, the provision of means on the handle for temporarily securing the two ends of the strand of floss and centering the strand of floss to the form of an isosceles triangle, ready for use, the said means comprising a centering notch extended obliquely through one lateral margin of the handle and having its inner closed end disposed symmetrically with the said notches of the prongs of the fork and lock notches formed in the lateral margins of the handle in transverse alignment with the closed end of the said centering notch, and through which lock notches the joined ends of the strand of floss may be wound across the handle and the centering notch and conveniently held in place by the thumb of the user, for locking the strand in place for use.

JAMES A. STORM.